(12) United States Patent
Satterfield

(10) Patent No.: US 10,442,537 B2
(45) Date of Patent: Oct. 15, 2019

(54) DEPLOYABLE TABLE ASSEMBLY

(71) Applicant: Johnny A. Satterfield, Chatsworth, CA (US)

(72) Inventor: Johnny A. Satterfield, Chatsworth, CA (US)

(*) Notice: Subject to any disclaimer, the term of this patent is extended or adjusted under 35 U.S.C. 154(b) by 113 days.

(21) Appl. No.: 15/655,658

(22) Filed: Jul. 20, 2017

(65) Prior Publication Data
US 2019/0023402 A1   Jan. 24, 2019

(51) Int. Cl.
*B64D 11/06* (2006.01)
*A47B 5/04* (2006.01)
*A47B 5/00* (2006.01)

(52) U.S. Cl.
CPC .......... *B64D 11/0605* (2014.12); *A47B 5/006* (2013.01); *A47B 5/04* (2013.01)

(58) Field of Classification Search
CPC ........ B64D 11/0605; A47B 5/006; A47B 5/04
See application file for complete search history.

(56) References Cited

U.S. PATENT DOCUMENTS

| | | | |
|---|---|---|---|
| 3,880,094 A | 4/1975 | Kopp et al. | |
| 3,899,982 A | 8/1975 | Fetzek | |
| 4,159,071 A | 6/1979 | Roca | |
| 4,174,669 A | 11/1979 | Lalonde | |
| 4,345,758 A | 8/1982 | Kempf | |
| 4,944,552 A | 7/1990 | Harris | |
| 5,033,574 A | 7/1991 | Kushi et al. | |
| 5,140,914 A | 8/1992 | Bohbot et al. | |
| 5,370,060 A | 12/1994 | Wang | |
| 5,540,158 A | 7/1996 | Ford | |
| 5,709,155 A | 1/1998 | Terracciano | |
| 6,007,036 A * | 12/1999 | Rosen ................. B60R 11/0235 224/281 |
| 6,161,486 A | 12/2000 | Boots | |
| 6,454,349 B1 | 9/2002 | Konya | |
| 6,488,248 B1 | 12/2002 | Watt et al. | |
| 6,761,398 B2 | 7/2004 | Bentley et al. | |

(Continued)

FOREIGN PATENT DOCUMENTS

| | | |
|---|---|---|
| DE | 2119052 A1 | 11/1972 |
| KR | 19980035029 | 9/1998 |
| KR | 20010089971 | 8/2000 |

OTHER PUBLICATIONS

ISA/US, International Search Report and Written Opinion in co-pending PCT International Appln. No. PCT/US18/27254 dated Jun. 28, 2018.

*Primary Examiner* — Hanh V Tran
(74) *Attorney, Agent, or Firm* — Matthew J. Spark; Stefan J. Kirchanski; Zuber Lawler & Del Duca LLP

(57) ABSTRACT

A table assembly movable between stowed and deployed configurations. A base portion is attachable to a surface, and a table portion is moveable between retracted and extended positions. The table portion includes upper and lower surfaces. An arm portion has first and second ends, the first end engaging the base portion and the second end disposed within the table portion. The table portion is slidably moveable along a longitudinal axis of the arm portion between the retracted and extended positions, and rotatable about the longitudinal axis of the arm portion between generally vertical and generally horizontal positions when the table portion is in the extended position.

14 Claims, 13 Drawing Sheets

(56) References Cited

U.S. PATENT DOCUMENTS

| | | | |
|---|---|---|---|
| D575,456 S | 8/2007 | Tsay et al. | |
| 7,281,763 B1 | 10/2007 | Getfield | |
| 7,506,923 B1 | 3/2009 | Gauss | |
| 7,675,742 B2 | 3/2010 | Wu et al. | |
| 7,806,305 B1 | 10/2010 | Moore et al. | |
| 7,942,374 B2 | 5/2011 | Timm et al. | |
| 7,963,231 B2 | 6/2011 | Osborne et al. | |
| 8,365,678 B2 | 2/2013 | Morbidelli | |
| 8,616,137 B2 | 12/2013 | Collins et al. | |
| 8,997,660 B2 | 4/2015 | Satterfield | |
| 9,027,486 B1 * | 5/2015 | Berkovitz | B60N 3/002 108/40 |
| 9,527,456 B2 * | 12/2016 | Ackeret | B60R 11/02 |
| 9,617,001 B2 * | 4/2017 | Zimmermann | B64D 11/00153 |
| 9,732,901 B2 * | 8/2017 | Satterfield | F16M 11/121 |
| 2002/0003361 A1 | 1/2002 | Duerr et al. | |
| 2006/0219857 A1 * | 10/2006 | Satterfield | B60R 11/0235 248/284.1 |
| 2012/0055503 A1 | 3/2012 | Kuo | |
| 2012/0133180 A1 | 5/2012 | Moulton et al. | |
| 2014/0300148 A1 | 10/2014 | Frost et al. | |
| 2015/0284089 A1 | 10/2015 | Gow et al. | |
| 2015/0321592 A1 | 11/2015 | De Morais | |
| 2016/0083096 A1 | 3/2016 | Gagnon | |

* cited by examiner

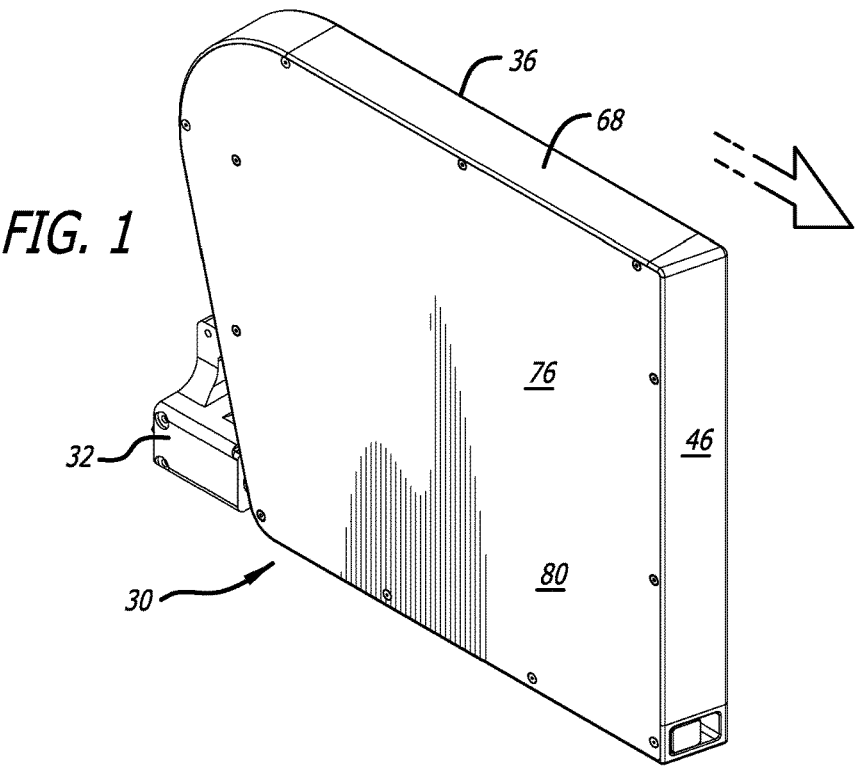
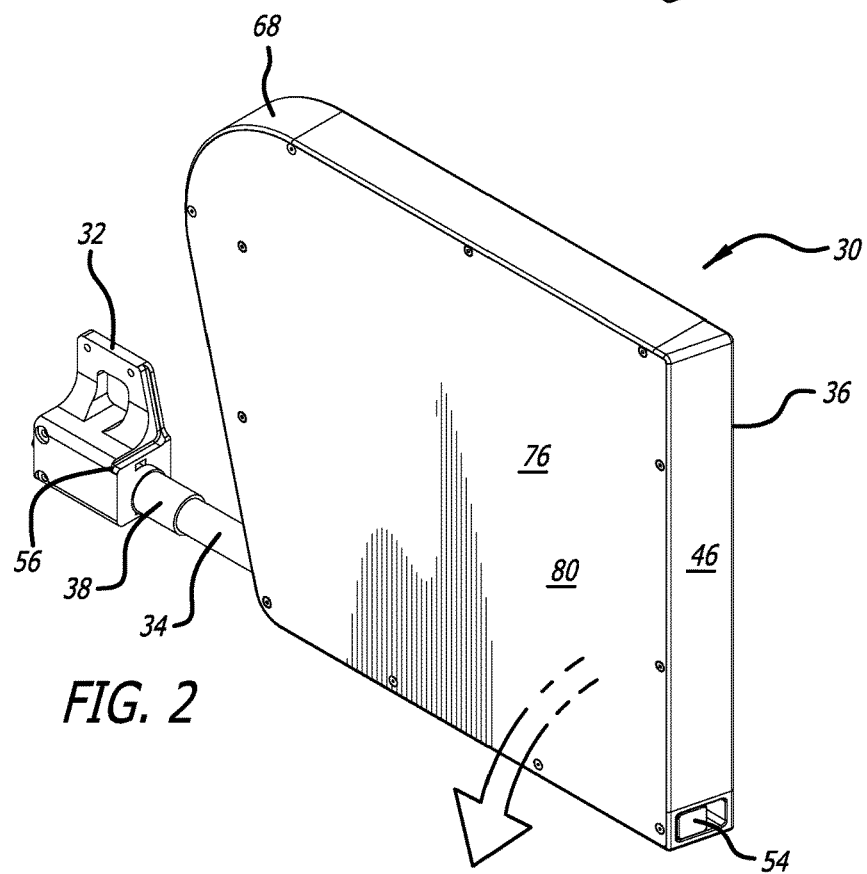

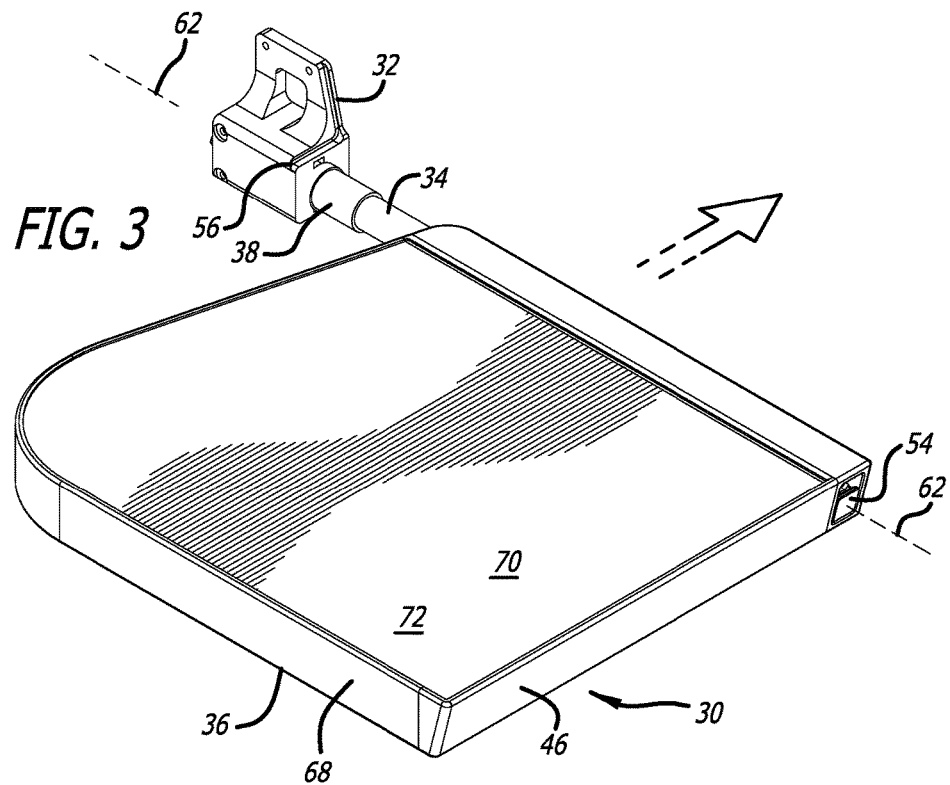
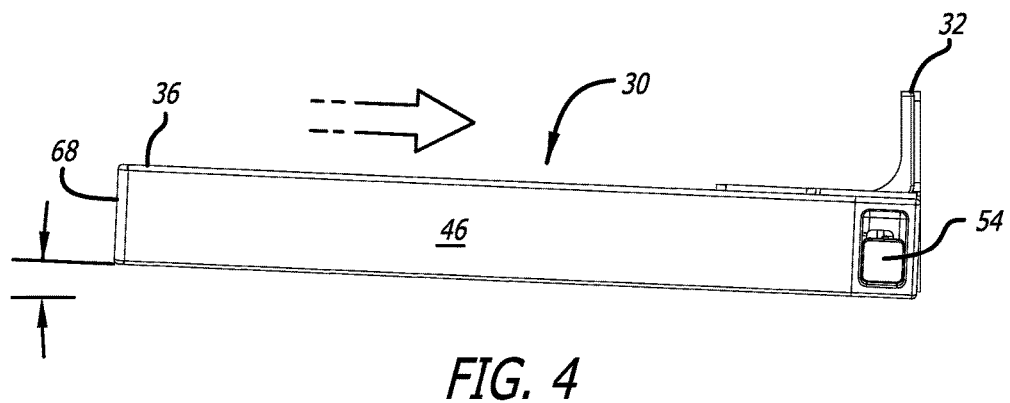

DEPLOYABLE TABLE ASSEMBLY

BACKGROUND

The present invention relates generally to tables. More particularly, the present invention relates to a deployable table associated with an aircraft passenger seat Commercial airline companies strive to provide improved services for their customers as well as improving passenger comfort and convenience. It is common for passengers on both private and commercial aircraft to have use of tables built into the seatback of a passenger seat directly in front of them or tables deployable from within a seat console to one side of the passenger where the table surface must be unfolded to provide sufficient surface area for placement of food, drink or other objects thereupon.

Different types of tables associated with aircraft passenger seats have been proposed that can be moved between stowed and deployed positions. However, such tables have their limitations and can always be improved.

Accordingly, there is a need for an improved table movable between stowed and deployed positions. There is also a need for table that can be stowed within a seat console. There is an additional need for a table that is easier to manufacture, assemble, adjust, and maintain. The present invention satisfies these needs and provides other related advantages.

SUMMARY

The table assembly illustrated herein provides a table movable between stowed and deployed positions. The table assembly illustrated herein is easier to stow and deploy. The table assembly illustrated herein can be stowed within a seat console. The table assembly illustrated herein is easier to manufacture, assemble, adjust, and maintain.

In an illustrative embodiment, a table assembly is movable between stowed and deployed configurations. The table assembly includes a base portion attachable to a surface; a table portion moveable between retracted and extended positions, wherein the table portion includes upper and lower surfaces; and an arm portion having first and second ends, the first end engaging the base portion and the second end disposed within the table portion. The table portion is slidably moveable along a longitudinal axis of the arm portion between the retracted and extended positions, and rotatable about the longitudinal axis of the arm portion between generally vertical and generally horizontal positions when the table portion is in the extended position.

The horizontal position can include first and second horizontal positions, with the table portion being laterally moveable between the first and second horizontal positons.

The base portion includes a stop, and the table portion includes a latch removably engaging the stop. The latch prevents movement of the arm portion in a first direction towards the extended position when the latch engages the stop.

The table portion includes a stop which prevents rotational movement of the table portion about the longitudinal axis of the arm portion beyond the generally horizontal position.

The table portion includes a stop which prevents downward vertical movement of the table portion relative to the arm portion when the table portion is in the extended position.

The table assembly further includes a damper limiting rotational movement of the table portion about the longitudinal axis of the arm portion between the generally vertical and generally horizontal positions.

The table assembly also includes a carriage operationally interconnecting the arm portion and the table portion. The table portion includes a rack, and the carriage includes a pinion with the rack engaging the pinion as table portion laterally moves between first and second horizontal positions.

The table portion includes a channel, and the arm portion operationally engages the channel. The arm portion includes rollers configured to engage the channel, and the channel limits rotation of the table portion during engagement of the rollers and the channel.

The arm portion limits rotation of the table portion.

The table portion is in a generally vertical orientation in the stowed configuration, and in a generally horizontal orientation in the deployed configuration.

The table assembly, in combination with a seat console that includes an exterior surface and recess formed therein, is stowed generally within the recess when the table assembly is in the stowed configuration. The recess is sized and shaped to receive the table assembly, with a side of the table portion facing outward from the recess and forming at least a portion of the exterior surface of the seat console that generally conforms with a remaining portion of the exterior surface of the seat console. The base portion is moveable within the recess between stowed and deployed positions.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 1 illustrates a perspective view of a table assembly illustrating an embodiment of the present invention in a fully stowed configuration, with an arrow indicating a general direction in which a table portion of the table assembly is to be translationally moved by a user towards deployment;

FIG. 2 illustrates a perspective view of the table assembly of FIG. 1 with a table portion in a partially deployed, generally vertical position, with an arrow indicating a general direction in which the table portion of the table assembly is to be rotationally moved by the user towards deployment;

FIG. 3 illustrates a perspective view of the table assembly of FIG. 1 with the table portion in a partially deployed, angled position, with an arrow indicating a general direction in which the table portion of the table assembly is to be translationally moved by the user towards deployment;

FIG. 4 illustrates a side view of the table assembly of FIG. 3, illustrating the table portion is at an angle with respect to a generally horizontal plane, with an arrow indicating a general direction in which the table portion of the table assembly is to be translationally moved by the user towards deployment;

DETAILED DESCRIPTION

Figure 5:
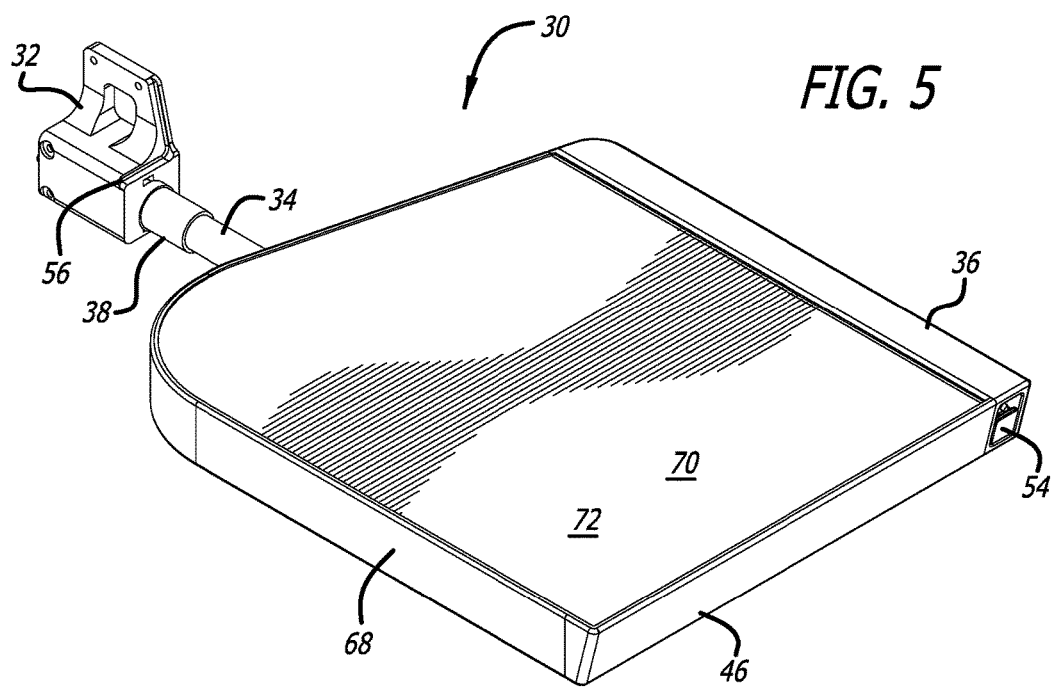
FIG. 5 illustrates a perspective view of the table assembly of FIG. 1 with the table portion in a fully deployed, generally horizontal position.
Figure 6:
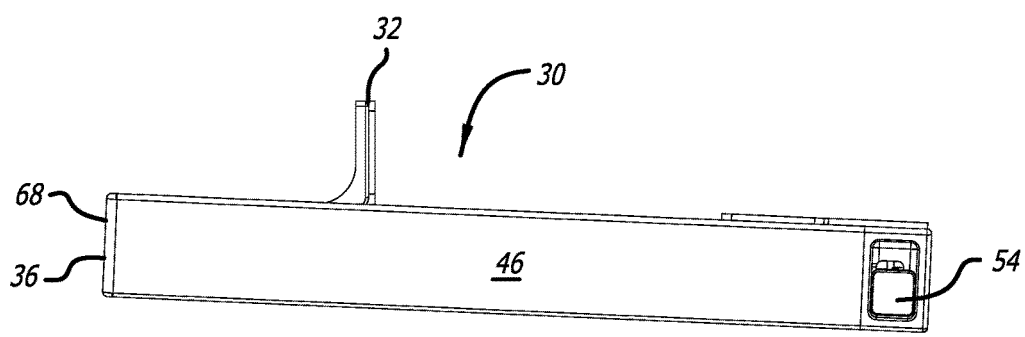
FIG. 6 illustrates a side view of the table assembly of FIG. 5.
Figure 7:
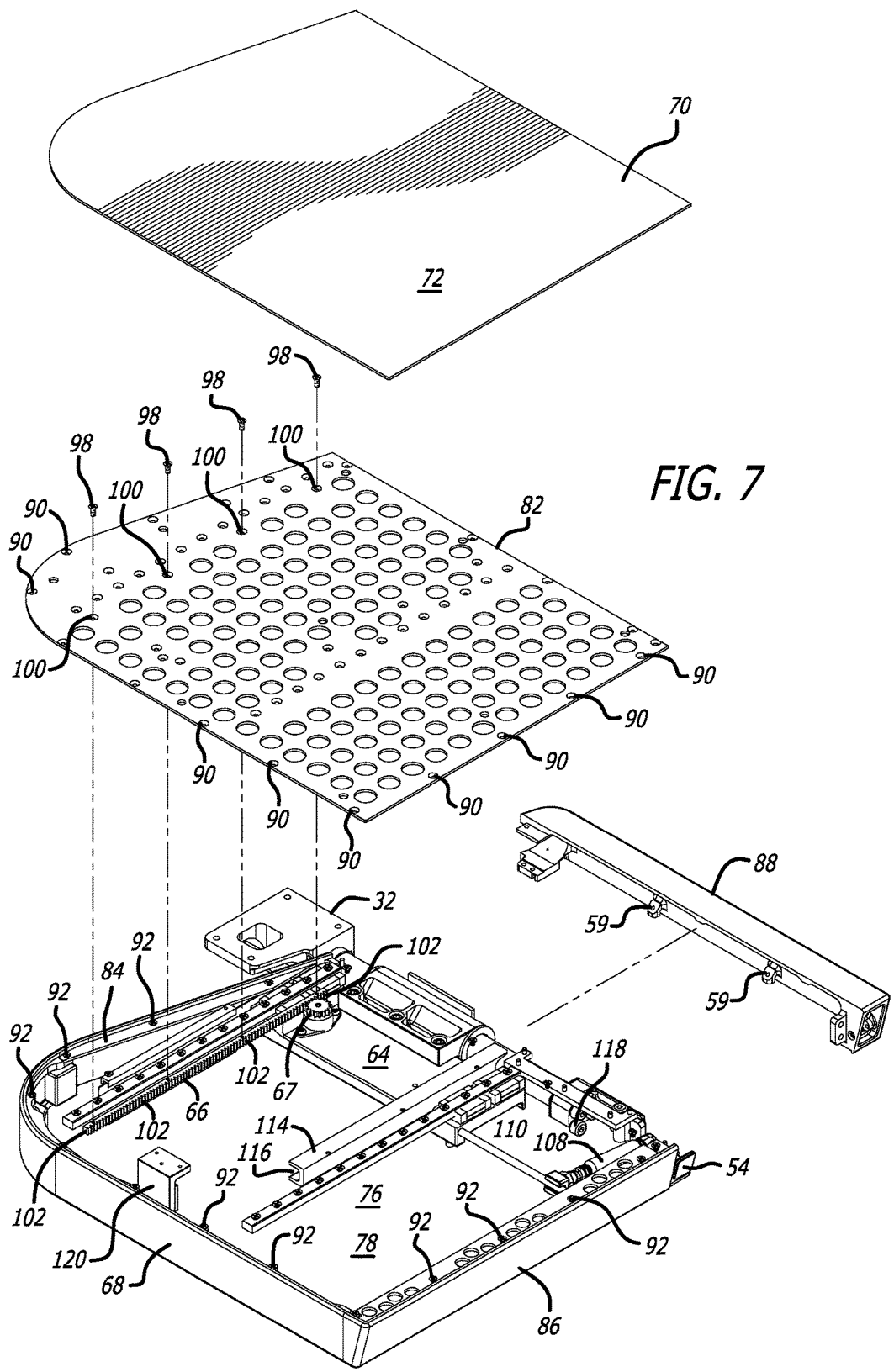
FIG. 7 illustrates an exploded, perspective view of the table assembly of FIG. 1 rotated ninety degrees in the fully stowed position.
Figure 8:
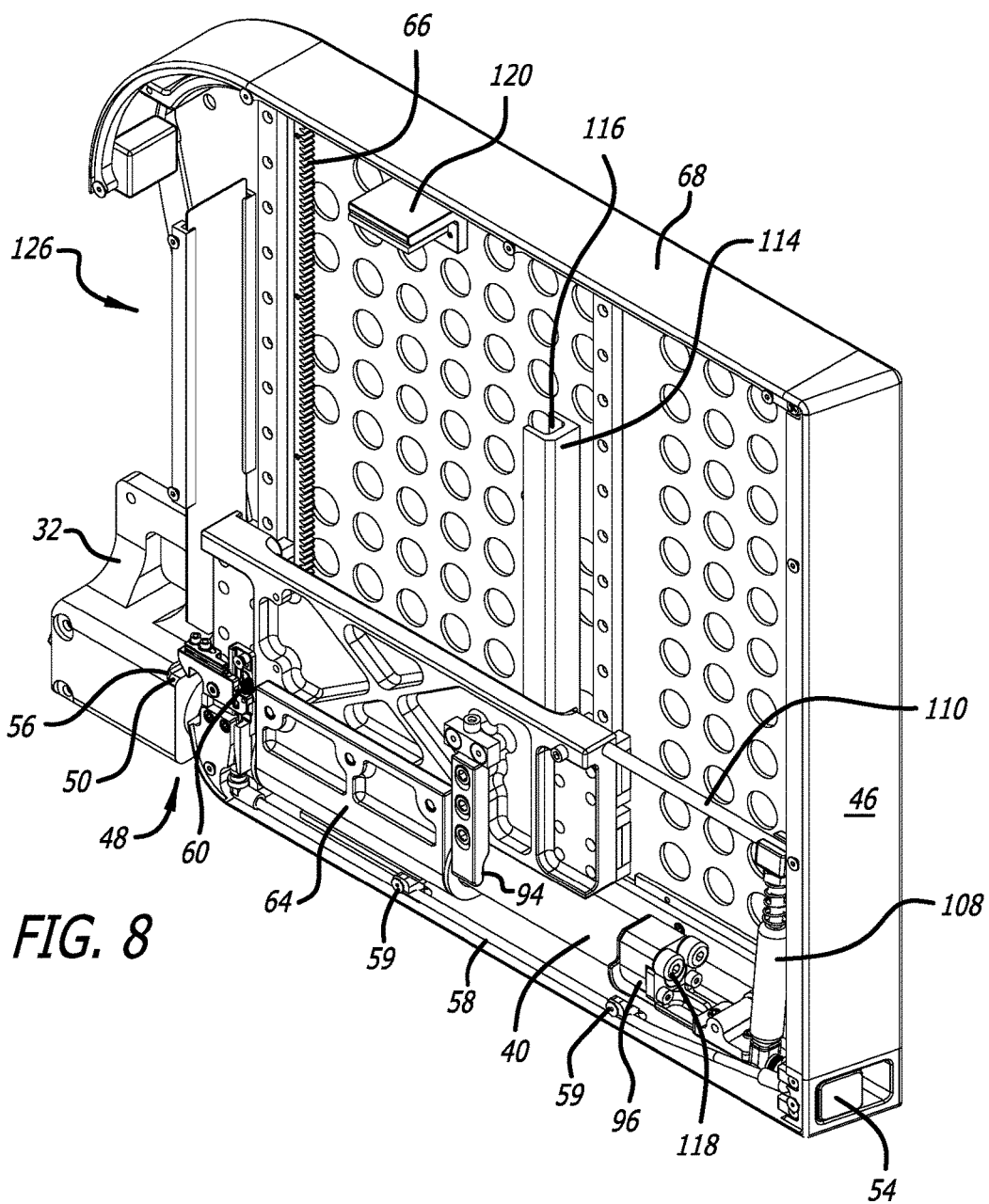
FIG. 8 illustrates the table assembly of FIG. 1, seen with a bottom panel of the table portion removed to provide a view of the interior of the table portion, and a portion of ar frame of the table portion facing the base portion removed to provide a view of the base portion.

The following detailed description describes present embodiments with reference to the drawings. In the drawings, reference numbers label elements of present embodiments. These reference numbers are reproduced below in connection with the discussion of the corresponding drawing features.

It is to be understood that the figures and descriptions of the present invention have been simplified to illustrate elements that are relevant for a clear understanding of the present invention, while eliminating, for the purpose of clarity, many other elements found in deployable tables. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

As shown in FIGS. 1-19 for purposes of illustration, an embodiment of the present invention resides in a table assembly 30 movable between stowed and deployed configurations. The table assembly 30 comprises a base portion 32, an arm portion 34, and a table portion 36. The base portion 32 is attachable to a surface (not shown) by fasteners (e.g., mechanical fasteners including, but not limited to, screws, bolts and nuts, etc.). The arm portion 34 has first and second ends 38, 40. The first end 38 of the arm portion 34 engages the base portion 32, and the second end 40 of the arm portion 34 operationally engages the table portion 36, and is at least partially disposed therewithin.

The table assembly 30 may be used in connection with a wall, bulkhead, or a seat console 200 having a wall with an exterior surface 202, and a recess 204 extending a depth past the surface 202. The table assembly 30 may be stowed generally within the recess 204 when the table assembly 30 is in a stowed configuration, the recess 204 being sized and shaped to receive the table assembly 30. When the table assembly 30 is in the stowed configuration, the table portion 36 is in a generally vertical position, and an exterior side 46 of the table portion 36 faces outwardly from the recess 204, forming at least a portion of the exterior surface 202 of the seat console 200, and generally conforming to and flush with a remaining portion of the exterior surface 202 of the seat console 200.

The base portion 32 is moveable within the recess 204 between stowed and deployed positions. The base portion 32 may be fixedly attached to a panel (not shown) that slidingly engages an interior sidewall of the recess 204. In the alternative, the base portion 32 may act as a carriage that slides along a track (not shown) attached to (or formed within) an interior sidewall (not shown) of the recess 204. In any event, when moving the base portion 32 from its retracted position (i.e., the position the base portion 32 is in when the table assembly 30 is the stowed configuration) to its extended position, the base portion 32 moves from within an interior of the recess 204 towards an opening 206 of the recess 204 near or at the exterior surface 202.

The table portion 36 is manually moveable by a user between a retracted position relative to the base portion 32 and an extended position relative to the base portion 32. In the stowed configuration, the table portion 36 is in a generally vertical orientation or position, and remains in the generally vertical orientation or position as the table portion 36 moves between the retracted and extended positions. As the base portion 32 is moveable within the recess 204, the table portion 36 may be in the extended position while still partially within the recess 204 or even in the retracted position while outside of the recess 204.

The table portion 36 operationally engages, and is slidably moveable along, a longitudinal length of the arm portion 34 between the retracted and extended positions of the table portion 36. When being deployed, the table portion 36 moves along the arm portion 34 from the retracted position towards the extended position while in the generally vertical orientation or position.

Figure 17:
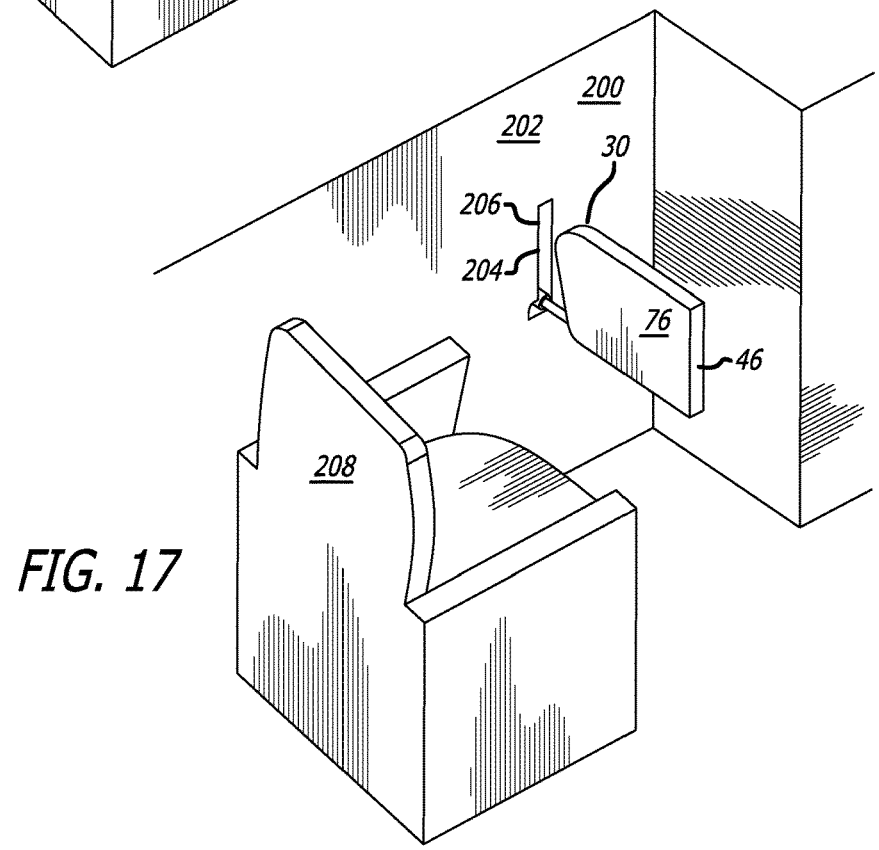
FIG. 17 illustrates the table assembly of FIG. 16 with a table portion in a partially deployed, generally vertical position.
Figure 18:
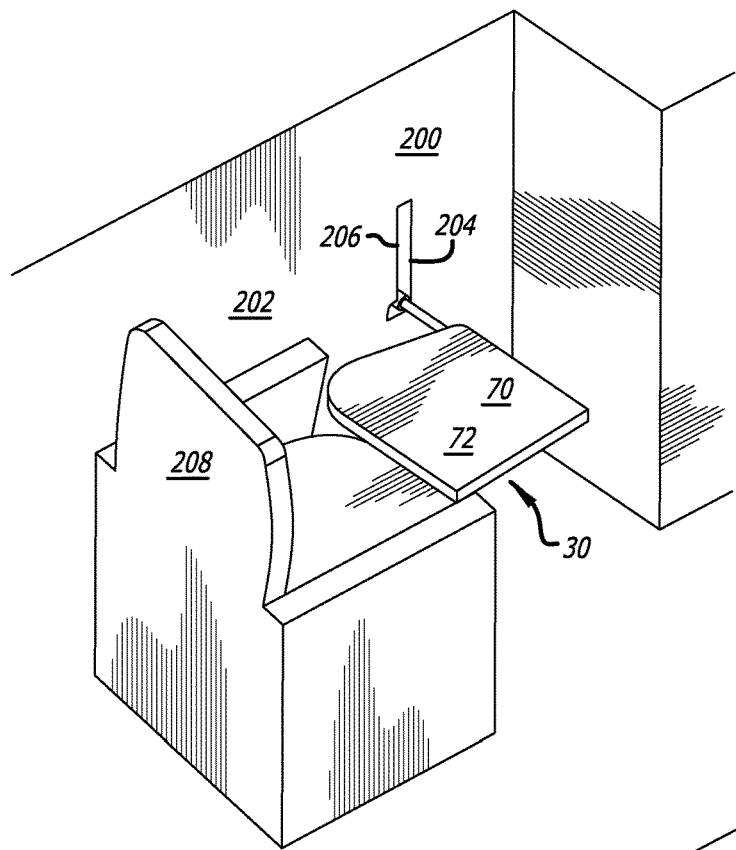
FIG. 18 illustrates the table assembly of FIG. 16 with the table portion in a partially deployed, angled position.

Only upon reaching the extended position is the table portion 36 able to be rotated about a longitudinal central axis 62 of the arm portion 34 between the generally vertical orientation or position and a first generally horizontal orientation or position. Interior walls of the recess 204 keep the table portion 36 from rotating until the table portion 36 reaches the extended position outside of the recess 204 and past the exterior surface 202. But once the table portion 36 reaches the extended position seen in FIG. 17, the table portion 36 is free to rotate about the longitudinal axis 62 downwards towards the first generally horizontal position, as seen in FIG. 18. In the first generally horizontal position of the table portion 36 (as seen in FIGS. 3, 4, 10, 14, and 18), the arm portion 34 is located at the same end of the table portion 36 the arm portion 34 is located at when the table portion 36 is its vertically oriented, extended position (a difference being that the table portion 36 has been rotated about the longitudinal axis 62). As seen in FIG. 4, the table portion 36 is generally horizontal, but at a two (2) to (3) degree angle relative to a horizontal plane due the fact that aircraft travel through air at a slight angle. This slight angle is compensated for by the two (2) to (3) degree incline of the table portion 36 relative to the horizontal plane so that the table portion 36 will be generally level during flight. This two (2) to (3) degrees incline is referred to/known as the flight compensation angle. If a seat is facing forward, the table portion 36 deploys slightly less than 90 degrees, and if the seat is facing aft, the table portion 36 deploys slightly more than 90 degrees. In either case, this is so that a top surface 72 of the table portion 36 is generally perpendicular to gravity during flight.

The table assembly 30 includes a latch mechanism 48 for holding the table portion 36 in the retracted position. The latch mechanism 48 includes a stationary, spring-loaded latch lever 50 operatively connected to a pivot pin or axle 52 about which the lever 50 rotates. The table portion 36 includes a button or tab 54 on the exterior side 46. In the retracted position, a downwardly-facing hook portion of the latch lever 50 engages a stop 56. The stop 56 is in the form of a tab or flange extending upwardly from the base portion 32 with an interior surface of the hook portion engaging a side of the stop 56 facing the interior of the recess 204. The latch lever 50 removably engages the stop 56. The engagement of the interior side of the hook portion of the latch lever 50 and the interior facing side of the stop 56 prevents the table portion 36 moving from the retracted position towards the extended position. The latch lever 50 can be selectively disengaged from the stop 56 by actuating (e.g., pulling) the tab 54 which, in turn, disengages the hook portion from the stop 56, allowing the table portion 36 to move away from the base portion 32 towards the extended position. The latch lever 50 and the tab 54 are operationally connected by a cable 58. The cable 58 can be in the form of various cables including, without limitation, a Bowden-type control cable having an outer sheath and an inner wire. One end of the cable 58 is operationally connected to the tab 54. The other end of the cable 58 is operationally connected to an end of the lever 50. Actuating the tab 54 pulls on the cable 58 which, in turn, pulls on one end of the latch lever 50, and causes the lever 50 to pivot about the pivot axle 52. The cable 58 is held in position within the table portion 36 by a number of guides 59 which allow the cable 58 to move longitudinally (e.g., when the tab 54 pulls on the cable 58) but limit lateral movement of the cable 58 so as to prevent the cable 58 from kinking. The pivot axle 52 acts as an axis of pivot for the latch lever 50. Actuating the tab 54 causes the downwardly-facing hook portion of the latch lever 50 to pivot up and away from engagement with the stop 56, disengaging the latch lever 50 from the stop 56, and freeing the table portion 36 to move away from the retracted position towards the extended position. In the alternative, a different style of latching mechanism may be provided, such that the user pushing the tab 54 disengages the latch 50 from the stop 56, releasing the table portion 36 from the retracted position. Once the spring-loaded latch lever 50 is disengaged from the stop 56 and the table portion 36 manually moved away from the retracted position, the latch lever 50 will automatically pivot back to the position the latch lever 50 was in when the latch lever 50 engaged the stop 56 due to a spring 60 biasing the latch lever 50 to rotate about the pivot axle 52 back towards the position the lever 50 was in when it engaged the stop 56. However, the latch lever 50 will not engage the stop 56 at this time since the table portion 36 has moved away from the retracted position and the latch lever 50 has moved away from the base portion 32 and the stop 56. When the table portion 36 is manually moved back towards near the retracted position, an exterior surface of the hook portion of the latch lever 50 contacts a side of the stop 56 facing exterior to the recess 204, and as the table portion 36 moves further inwardly towards the retracted position, the contact between the contoured exterior surface of the hook portion of the latch lever 50 and the stop 56 causes the latch lever 50 to pivot about the pivot axle 52. This, in turn, causes the hook portion of the latch lever 50 to pivot upwards until the hook portion passes over the top of the stop 56 and the spring 60 biases the hook portion to re-engage the stop 56 to hold the table portion 36 in the retracted position.

The table portion 36 includes a frame 68, a top panel 70, and a bottom panel 76. The top panel 70 includes an upper surface 72 that serves as a generally planar, exterior-facing table surface for a user and a lower surface 74 facing the interior of the table portion 36. The bottom panel 76 includes an upper surface 78 facing the interior of the table portion 36 and a lower surface 80 providing a surface viewed by the user when the table portion 36 is in the generally vertical orientation or position. The table portion 36 further includes an interior panel 82 removably attached to an interior flange or lip 84 extending inwardly from an interior-facing surface of the frame 68. The frame 68 includes a main portion 86 generally forming three sides of the frame 68, and a latch portion 88 removably attached to the main portion 86 that forms the fourth side of the frame 68. The interior panel 82 is removably attached to the interior flange or lip 84 by mechanical fasteners (not shown) extending through apertures 90 in the interior panel 82 to matingly engage receiving apertures or bores 92 on the interior flange or lip 84 (not every aperture 90 or bore 92 is explicitly identified in FIG. 7). The interior panel 82 acts as a mount to which various components within an interior of the table portion 36 may be mounted so that the components may operationally engagement other components of the table assembly 30 disposed within the interior of the table portion 36. The top panel 70, the bottom panel 76, and the interior panel 82 have similar shapes to generally match the shape of the frame 68. Alternative, the size and shape of the frame 68 and panels 70, 76, 82 can be adjusted to meet design or aesthetic needs. The thickness of the interior panel 82 is such that a top surface of the interior panel 82 is a distance below a top surface of the frame 68 such that when the top panel 70 is stacked on top of the interior panel 82, the upper surface 72 of the top panel 70 is generally even with the top surface of the frame 68, with the top panel 70 being inset within the confines of the fame 68.

The table assembly 30 further includes a carriage 64 disposed within the table portion 36 that operationally interconnects the arm portion 34 and the table portion 36. A portion of the arm portion 34 passes through a bore 124 within the carriage 64. The bore within the carriage 64 is sized and shaped to receive the arm portion 34 such that the carriage 64 slidingly engages the arm portion 34. At least one bearing 128 is disposed between the arm portion 34 and the carriage 64 in order to assist rotation of the table portion 36 relative to the arm portion 34. The carriage 64 includes a stop 94 having a contoured surface sized and shaped to engage a matingly contoured surface of a stop 96 on the arm portion 34 to limit rotational movement of the table portion 36 about the longitudinal axis 62 of the arm portion 34. The engagement of the stops 94, 96 prevents rotational movement of the table portion 36 about the longitudinal axis 62 of the arm portion 34 beyond the table portion rotating to the first generally horizontal position from the generally vertical position. The carriage 64 limits lateral movement of the table portion 36 along a longitudinal length of the arm portion 34 in that movement of the arm portion 34 relative to the carriage 64 is limited by the arm portion 34 having a larger diameter which act as a stop on one end 38 when operationally engaging the carriage 64 and the stop 96 acting as a stop on the other end 40 when operationally engaging the carriage 64.

The arm portion 34 helps limits rotation of the table portion 36 about the longitudinal axis 62. The table assembly 30 further includes a damper mechanism 104 limiting rotational movement of the table portion 36 about the longitudinal axis 62 of the arm portion 34 between the generally vertical position and the first generally horizontal position in order to prevent the table portion 36 from falling towards a seated user once the table portion 36 is outside the recess 204. The arm portion 34 includes an extension 106. The damper mechanism 104 includes a gas spring 108 is rotationally connected to a distal end of the extension 106. A rod (e.g., ¼ inch rod) 110 extends from an interior side of the frame 68, generally parallel to the arm portion 34, within the interior of the table portion 36, with a portion of the rod 100 operationally passing at least partially into the carriage 64 and rotationally engaging the carriage 64 so as to allow the carriage 64 to rotate relative to the rod 110 as the table portion 36 moves between the generally vertical and first generally horizontal positions. The rod 110 engages the gas spring 108 by sliding through a clevis 112 on a top end of the gas spring 108 so as to allow the gas spring 108 to rotate relative to the rod 110 as the table portion 36 moves between the generally vertical and first generally horizontal positions. Thus, the gas spring 108 rotationally engages the arm portion 34 on one end and rotationally engages the table portion 36 (via the rod 110 engaging the carriage 64) on the other end. As the table portion 36 rotates downwards from the generally vertical to the first generally horizontal position, the gas spring 108 engages and keeps the table portion 36 from falling, with the gas spring 108 dampening the rotation of the table portion 36 from generally vertical to generally horizontal. In the alternative, or in supplement to the damper mechanism 104, a friction clutch is disposed about the arm portion 34 to provide rotational resistance to the table portion 36 such that the table portion 36 does not just flop downwards towards a seated user once the table portion 36 is outside the recess 204.

The engagement of the arm portion 34 and carriage 64 is also designed to prevent the table portion 36 from downward, vertical movement relative to the arm portion 34 when the table portion 36 is in a generally vertical orientation or position. The engagement of a roller 130 and a drop stop 132 (e.g., a generally L-shaped stop) which prevent the table portion 36 from downward, vertical movement when fully extended. The roller 130 is disposed on the extension 106 and operationally engages the drop stop 132 when the table portion 36 is in the generally vertical orientation. As the table portion 36 moves laterally relative to the arm portion 34, the roller 130 engages an underside 134 of the drop stop 132, preventing downward movement of the table portion 36. Rotation of the table portion 36 from the generally vertical orientation to the first generally horizontal orientation disengages the roller 130 and drop stop 132. Disengagment of the roller 130 and the drop stop 132 also allows the table portion 36 to move between the first and second generally horizontal positions.

The table portion 36 includes a rack 66 disposed within the table portion 36 that operationally engages a rotatable pinion 67 operationally connected to the carriage 64 so that the teeth of the pinion 67 engage the teeth of the rack 66 as the pinion 67 rotates in fixed position relative to the carriage 64, as the carriage 64 moves linearly relative to the rack 66. In this manner, the rack 66 engages the pinion 67 as the table portion 36 laterally moves between first and second generally horizontal positons. The rack 66 is connected to the interior panel 82 by mechanical fasteners 98 (e.g., screws, threaded bolts, or the like) passing through apertures 100 in the interior panel 82 to threadedly engage bores 102 in a side of the rack 66 facing the interior panel. The carriage 64 does not move linearly relative to the rack 66 when the table portion 36 is in the generally vertical portion nor does the carriage 64 move linearly relative to the rack 66 as the table portion 36 rotates from the generally vertical position to the first generally horizontal position.

Figure 16:
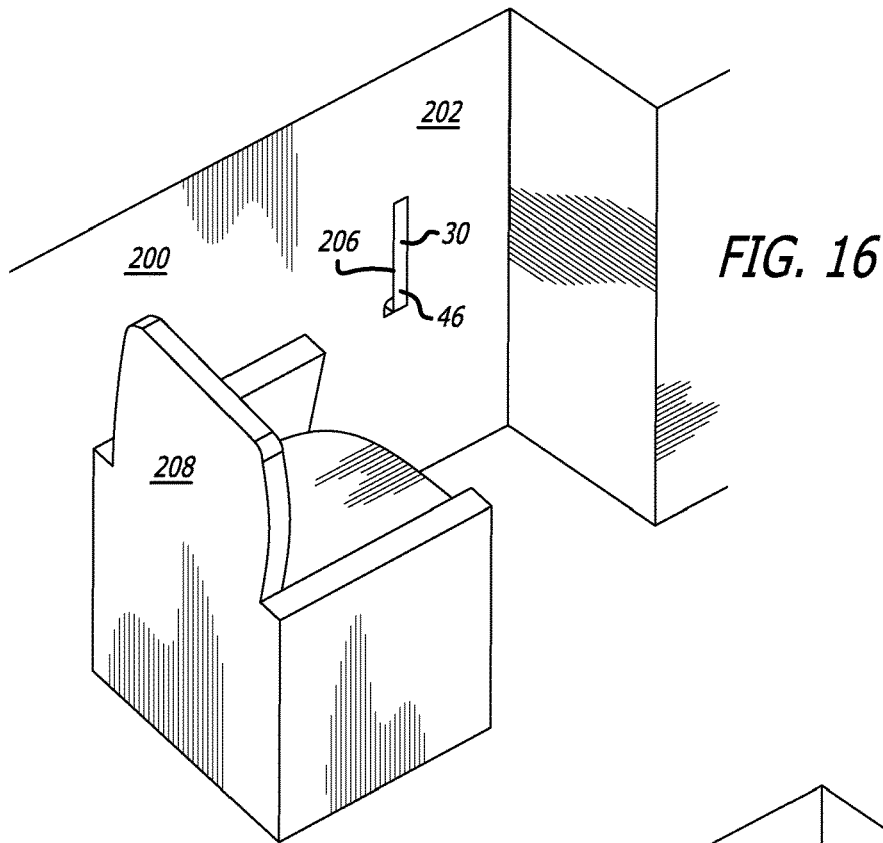
FIG. 16 illustrates a perspective view of an aircraft seating console with a table assembly illustrating an embodiment of the present invention in a fully stowed configuration.
Figure 19:
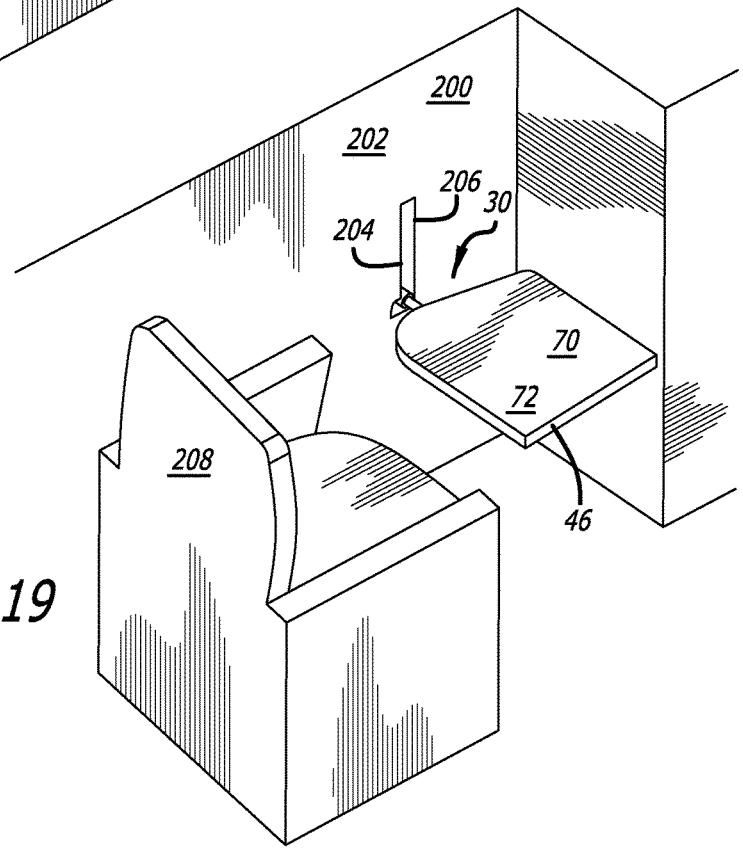
FIG. 19 illustrates the table assembly of FIG. 16 with the table portion in a fully deployed, generally horizontal position.

The table portion 36 includes a track 114 having a channel 116 defined therein. The arm portion 34 operationally engages the channel 116 as the table portion 36 moves from the first generally horizontal position to a second generally horizontal position (as seen in FIGS. 5, 6, 11, 15, and 18), with the rotary damper/gear rack 66, 67 dampening forward and aft translation of the table portion 36 between the first generally horizontal position and the second generally horizontal position. The arm portion 36 includes a pair of rollers 118 attached to one side of the stop 96. The rollers 118 are configured to align with the channel 116 once the table portion 36 has moved into the first generally horizontal position. Once rollers 118 are aligned with the channel 116, the user can manually move the table portion 36 from the first generally horizontal position towards the second generally horizontal position. The user need only move the table portion 36 a small distance between the rollers 118 operationally engage the channel 116. The channel 116 guides the rollers 118 as the table portion 36 moves towards the second generally horizontal position. The track 114 limits rotation between the arm portion 34 and the table portion 36 during engagement of the rollers 118 and the channel 116. Movement of the table portion 36 between the first and second generally horizontal positions is kept smooth by engagement of the rollers 118 and the channel 116 and by engagement of the pinion 67 and the rack 66 which help keep the carriage 64 aligned as the carriage 64 moves back and forth along the rack 66 and track 114. As the table portion 36 moves between the first and second generally horizontal positions, the arm portion 34 moves along a slot 126 in the side of the table portion 36 facing the base portion 32. An L-shaped stop 120 is operationally connected to the interior panel 82 and prevents the rollers 82 from leaving the track 114. When the table portion 36 reaches the second generally horizontal position, a side 122 of the carriage 64 contacts the stop 120, preventing further lateral movement of the rollers 118 along the channel 116. The table assembly 30 is in the deployed configuration, as seen in FIG. 19, when the table portion 36 is moved into the second generally horizontal position from the first generally horizontal position (i.e., when the stop 120 contacts the side 122 of the carriage 64). When the table portion 36 is in the second generally horizontal position, the table portion 36 retains the flight compensation angle. As seen in FIG. 16, the table portion 36 is in a generally vertical orientation in the stowed configuration of the table assembly 30, and in a generally horizontal orientation in the deployed configuration, as seen in FIG. 19.

Figure 9:
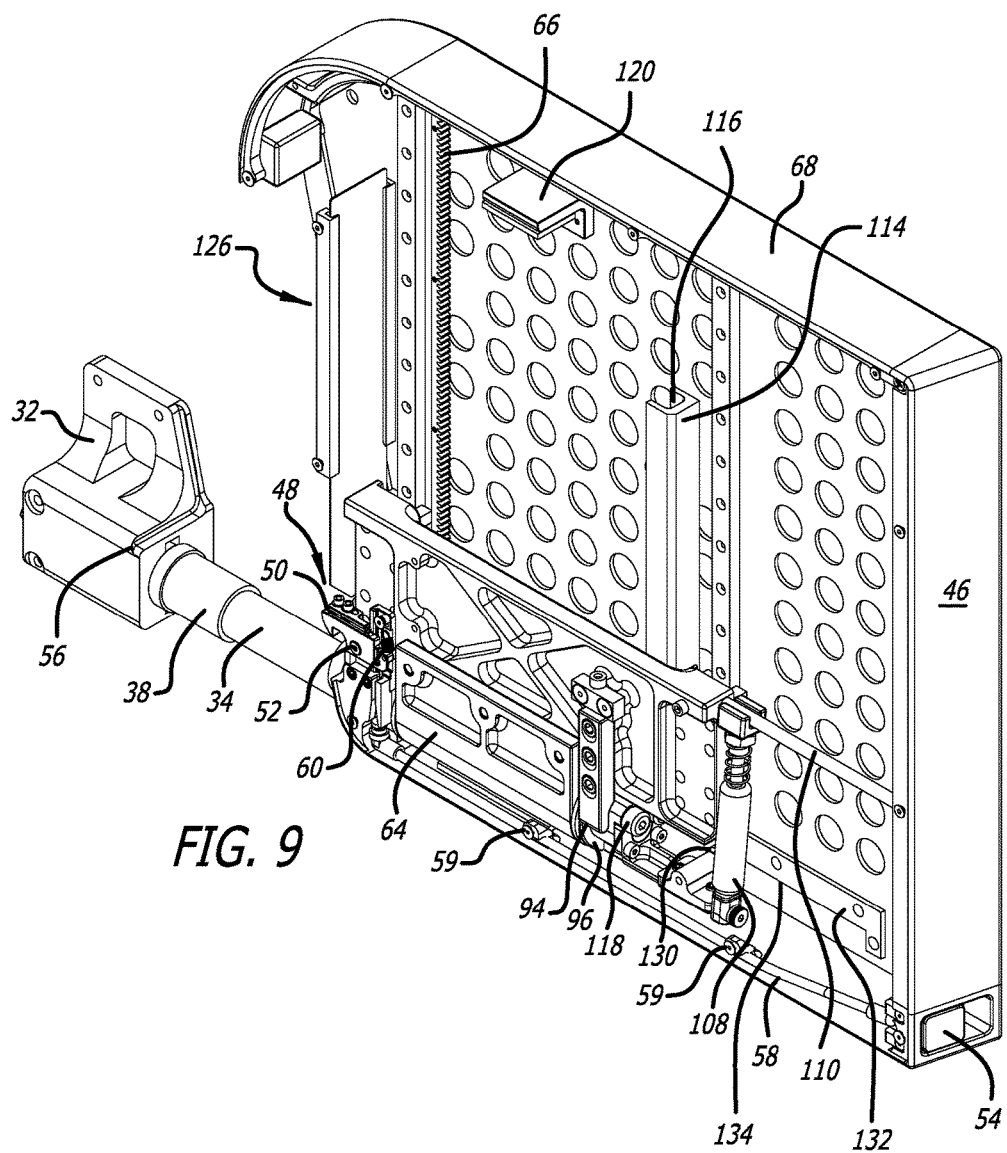
FIG. 9 illustrates the table assembly of FIG. 2, seen with the bottom panel of the table portion removed to provide a view of the interior of the table portion, and a portion of a frame of the table portion facing the base portion removed to provide a view of the base portion.
Figure 10:
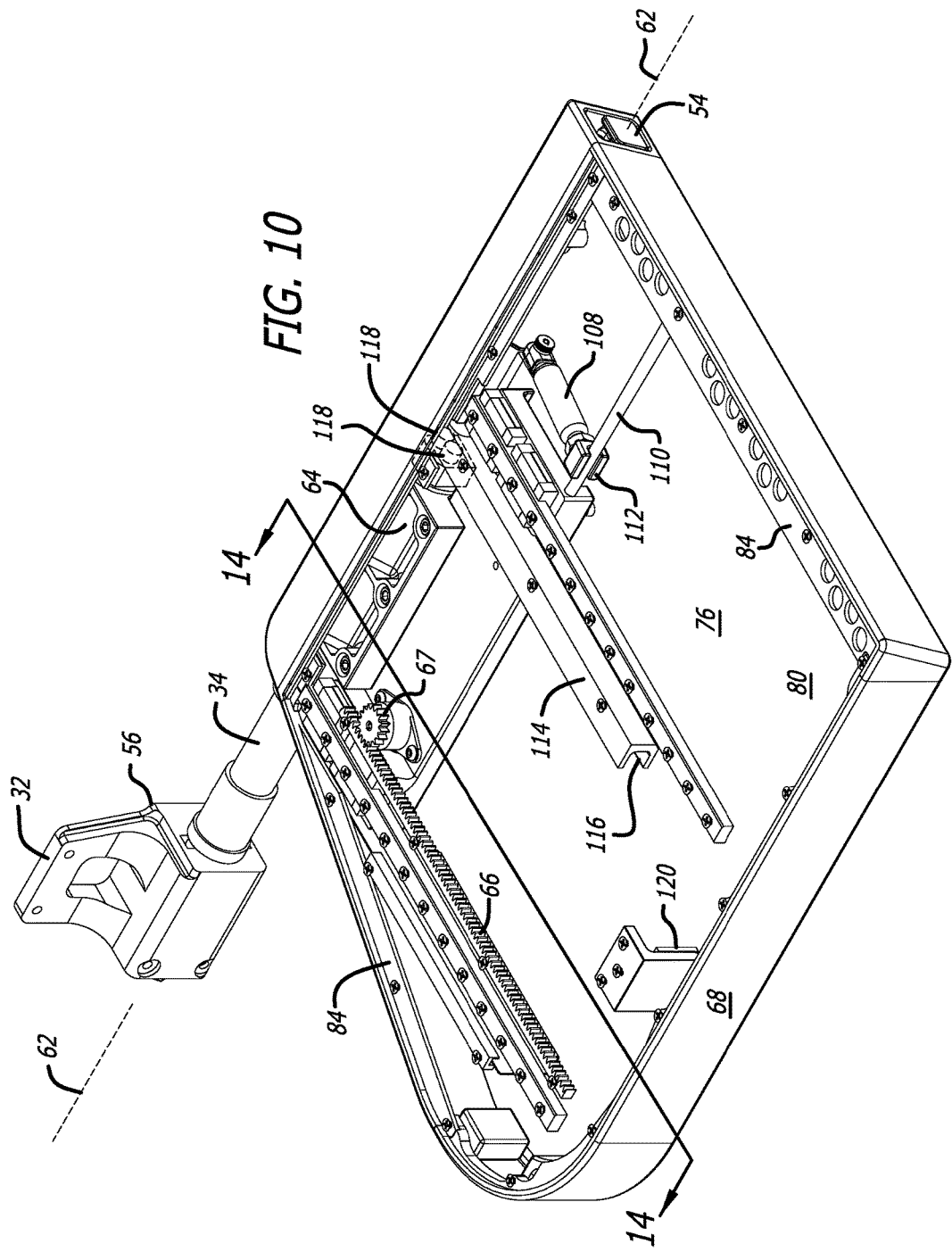
FIG. 10 illustrates the table assembly of FIG. 3, seen with a top panel of the table portion removed to provide a view of the interior of the table portion.
Figure 11:
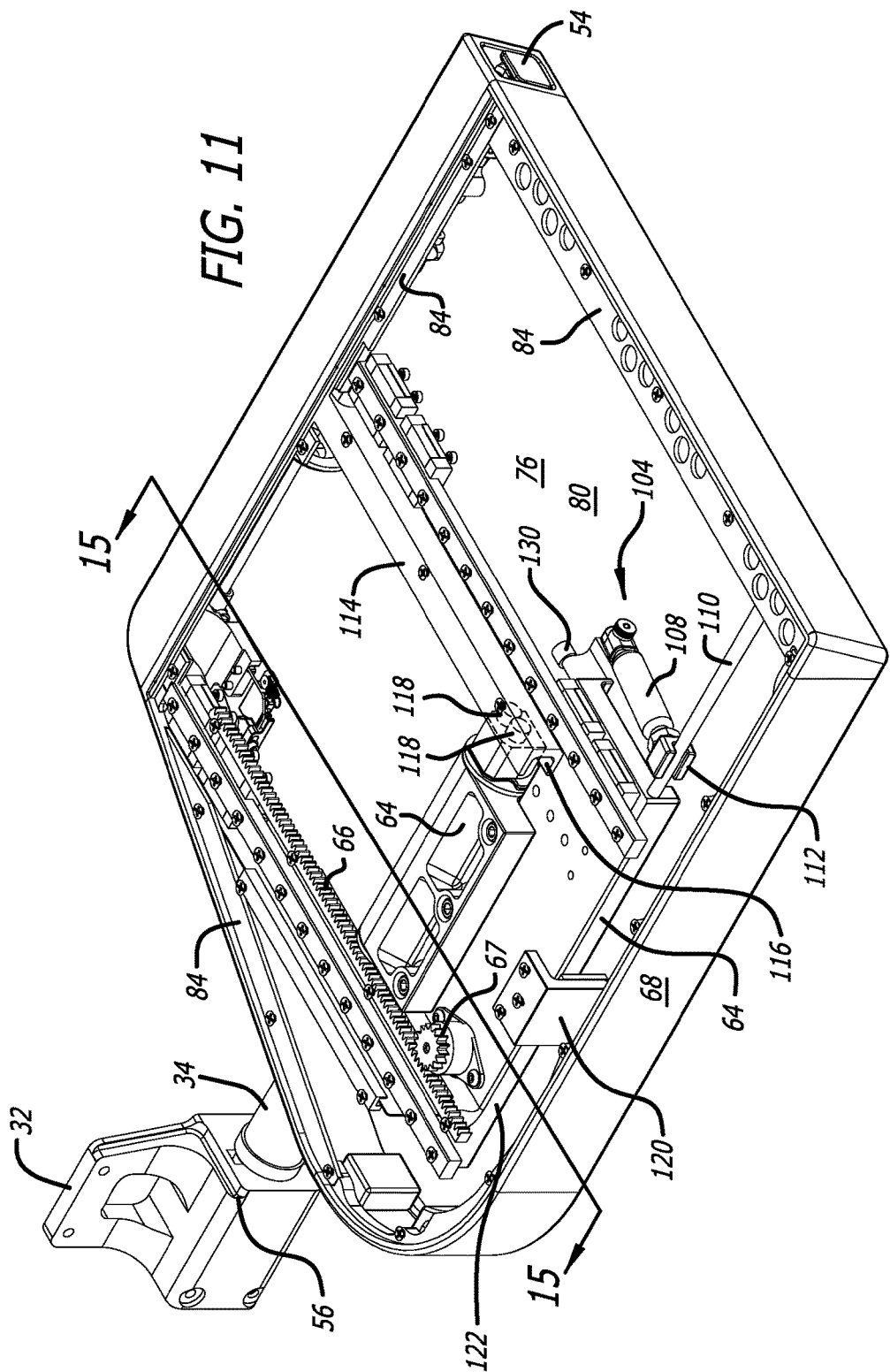
FIG. 11 illustrates the table assembly of FIG. 5, seen with the top panel of the table portion removed to provide a view of the interior of the table portion.
Figure 12:
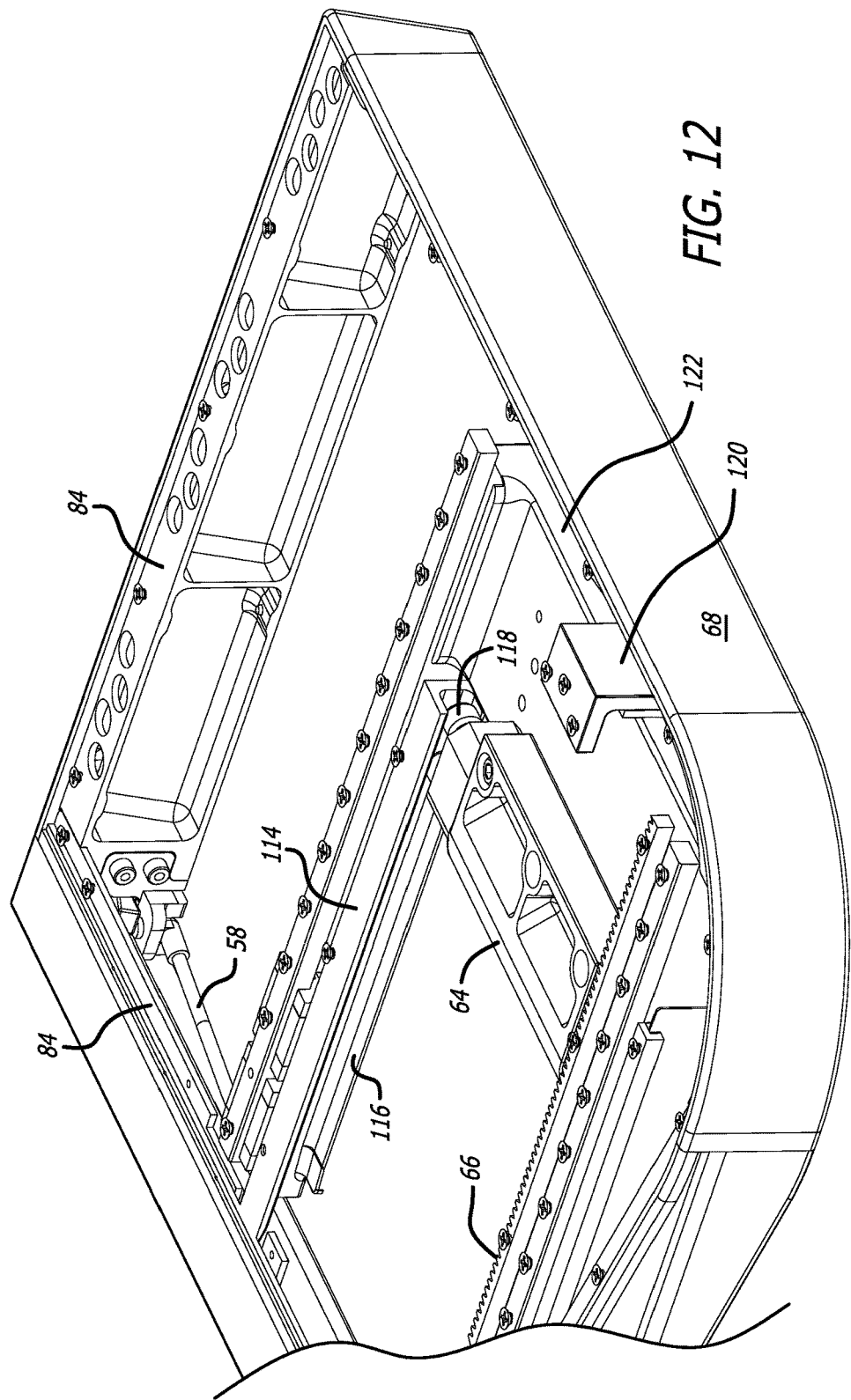
FIG. 12 illustrates a perspective view of the table portion with the top panel removed to provide another view of the interior of the table portion.
Figure 13:
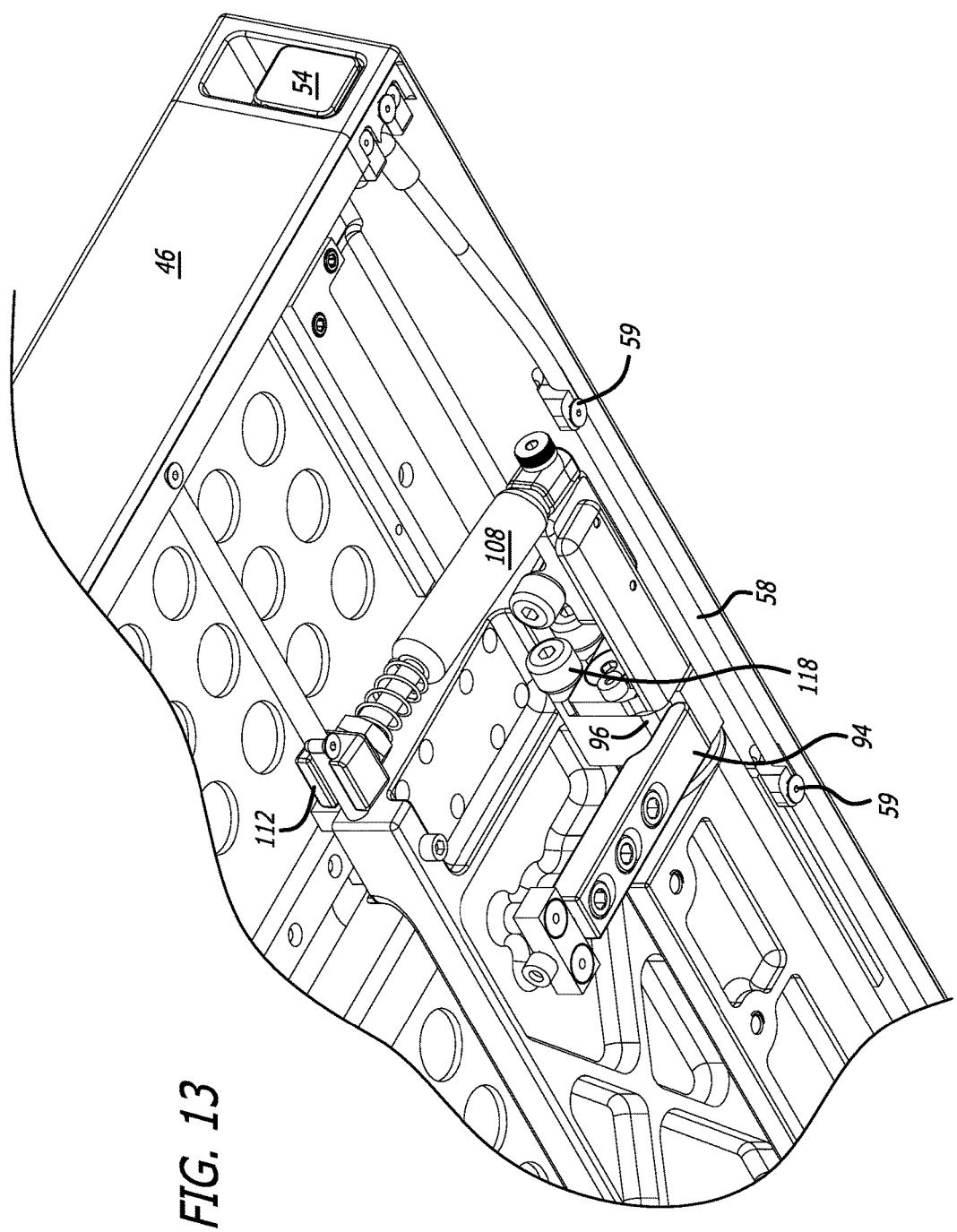
FIG. 13 illustrates a perspective view of the table portion with the bottom panel removed to provide another view of the interior of the table portion.
Figure 14:
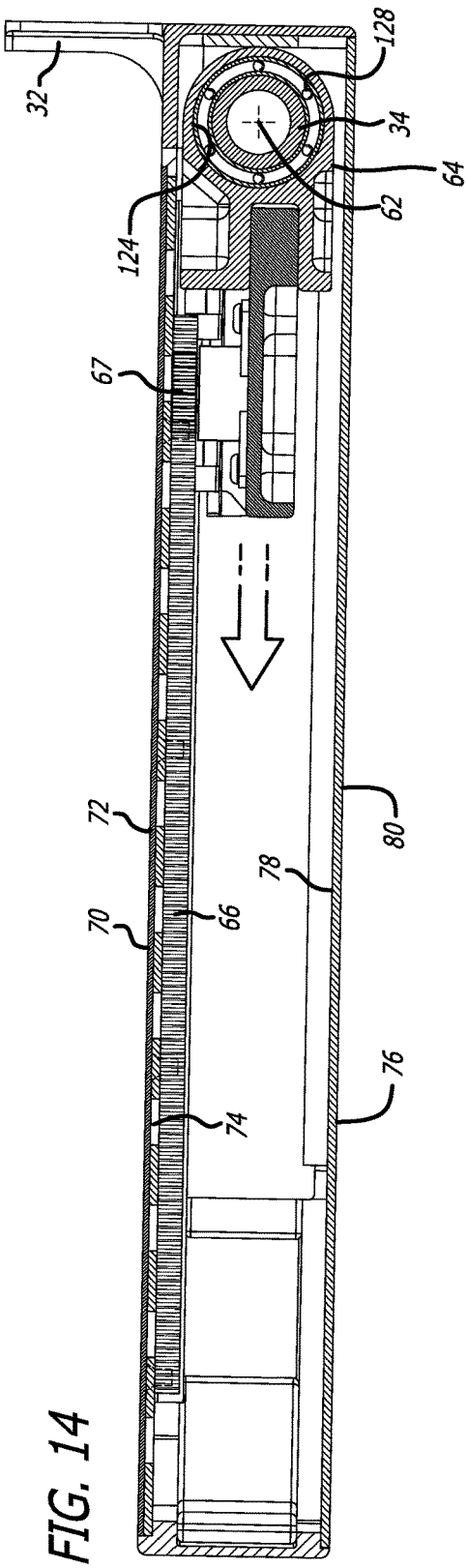
FIG. 14 illustrates a side cross-sectional view of the table assembly of FIG. 4, with an arrow indicating a general direction in which the table portion of the table assembly is to be translationally moved by the user towards deployment.
Figure 15:
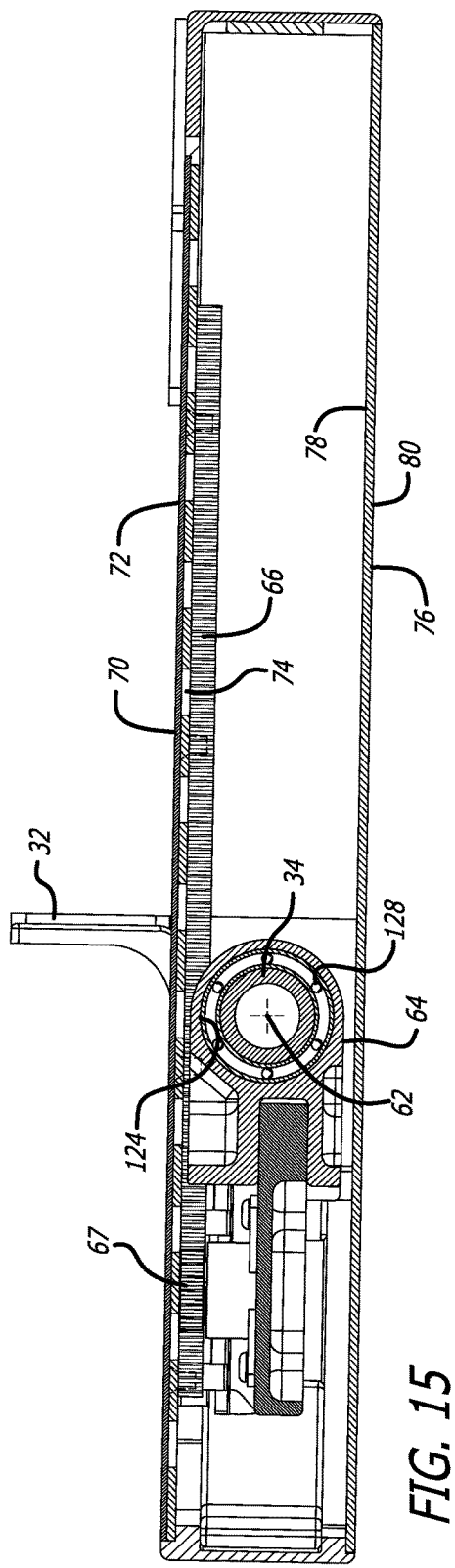
FIG. 15 illustrates a side cross-sectional view of the table assembly of FIG. 5.

In use, in order to deploy the table assembly 30 from the stowed configuration, a user seated at a seat 208 pulls on the tab 54 to release the latch mechanism 48 holding the table portion 36 in engagement with the base portion 32 in the retracted position, as seen in FIGS. 1, 7, 8, and 16. The user then manually pulls the table portion 36 until the table portion reaches its extended, generally vertical position outside the recess 204, as seen in FIGS. 2, 9, and 17. The table portion 36 may be spring-loaded such that once the latch mechanism 48 is released, the table portion 36 pops out a distance from the recess 204. The user then rotates the table portion 36 downwards until the table portion 36 is in the first generally horizontal position, as seen in FIGS. 3, 4, 10, 14, and 18. The user then pushes the table portion 36 laterally until the table portion 36 is in the deployed configuration of the table assembly 30, as seen in FIGS. 5, 6, 11, 15, and 19. The foregoing steps are generally reversed to move the table assembly 30 from its deployed configuration to its stowed configuration (e.g., when the user pushes the table portion 36 back into the recess 204, the latch mechanism 48 will automatically re-engage the table portion 36 with the base portion 32).

Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Likewise, the present invention is also not to be limited to use in vehicles and may be used in non-vehicle or stationary environments where there is seating, and it is desirable to stow and deploy a flat work surface for use in the types of activities that the flat surfaces of tables, desks, countertops or the like are typically used for. Furthermore, the present invention is also not to be limited to use in connection with seating, and may be used in any environment where the device may be stowed within and deployed from a recess formed in a surface (e.g., a wall, a desktop, a table), or attached to a flat surface (e.g., a wall, a desktop, a table) that does not have a recess into which the device may be stowed.

In addition, the claimed invention is not limited in size and may be constructed in miniature versions or for use in very large-scale applications in which the same or similar principles of motion and friction control as described above would apply. Likewise, the length and width of the table surface areas provided by the table assemblies are not to be construed as drawn to scale, and that the lengths/widths of the table surface areas may be adjusted in conformance with the area available for stowage/deployment of the table assemblies. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper," "horizontal," "vertical" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A table assembly movable between stowed and deployed configurations, comprising:
    a base portion attachable to a surface;
    a table portion moveable between retracted and extended positions, wherein the table portion includes upper and lower surfaces; and
    an arm portion having first and second ends, the first end engaging the base portion and the second end disposed within the table portion;
    wherein the table portion is slidably moveable along a longitudinal axis of the arm portion between the retracted and extended positions, and rotatable about the longitudinal axis of the arm portion between generally vertical and generally horizontal positions when the table portion is in the extended position.

2. The table assembly of claim 1, wherein the horizontal position comprises first and second horizontal positions, wherein the table portion is laterally moveable between the first and second horizontal positons.

3. The table assembly of claim 1, wherein the base portion includes a stop; and the table portion includes a latch removably engaging the stop, wherein the latch prevents movement of the arm portion in a first direction towards the extended position when the latch engages the stop.

4. The table assembly of claim 1, wherein the table portion includes a stop, wherein the stop prevents rotational movement of the table portion about the longitudinal axis of the arm portion beyond the generally horizontal position.

5. The table assembly of claim 1, wherein the table portion includes a stop, wherein the stop prevents downward vertical movement of the table portion relative to the arm portion when the table portion is in the extended position.

6. The table assembly of claim 1, further comprising a damper limiting rotational movement of the table portion about the longitudinal axis of the arm portion between the generally vertical and generally horizontal positions.

7. The table assembly of claim 1, further comprising a carriage operationally interconnecting the arm portion and the table portion.

8. The table assembly of claim 7, wherein the table portion includes a rack, the carriage includes a pinion, and wherein the rack engages the pinion as table portion laterally moves between first and second horizontal positions.

9. The table assembly of claim 1, wherein the table portion includes a channel, and the arm portion operationally engages the channel.

10. The table assembly of claim 9, wherein the arm portion includes rollers configured to engage the channel, and the channel limits rotation of the table portion during engagement of the rollers and the channel.

11. The table assembly of claim 1, wherein the arm portion limits rotation of the table portion.

12. The table assembly of claim 1, wherein the table portion is in a generally vertical orientation in the stowed configuration, and in a generally horizontal orientation in the deployed configuration.

13. The table assembly of claim 1, in combination with a seat console, wherein the seat console includes an exterior surface and recess formed therein, wherein the table assembly is stowed generally within the recess when the table assembly is in the stowed configuration, the recess sized and shaped to receive the table assembly, wherein a side of the table portion faces outward from the recess and forms at least a portion of the exterior surface of the seat console generally conforming with a remaining portion of the exterior surface of the seat console.

14. The table assembly of claim 13, wherein the base portion is moveable within the recess between stowed and deployed positions.

* * * * *